(12) United States Patent
Lin et al.

(10) Patent No.: US 10,807,422 B2
(45) Date of Patent: Oct. 20, 2020

(54) INLET CONTROL VALVE FOR AN AIR MAINTENANCE TIRE

(71) Applicant: The Goodyear Tire & Rubber Company, Akron, OH (US)

(72) Inventors: Cheng-Hsiung Lin, Hudson, OH (US); Robin Lamgaday, Wadsworth, OH (US); Christos Tsionidis, Stuttgart (DE); Frank Herrigel, Mühlacker (DE); Marcus Boertje, Port Washington, NY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 439 days.

(21) Appl. No.: 15/786,890

(22) Filed: Oct. 18, 2017

(65) Prior Publication Data
US 2018/0178600 A1   Jun. 28, 2018

Related U.S. Application Data

(60) Provisional application No. 62/437,943, filed on Dec. 22, 2016.

(51) Int. Cl.
*B60C 23/12* (2006.01)
*B60C 23/00* (2006.01)

(52) U.S. Cl.
CPC .......... *B60C 23/123* (2020.05); *B60C 23/004* (2013.01); *B60C 23/12* (2013.01)

(58) Field of Classification Search
CPC ..... B60C 23/12; B60C 23/123; B60C 23/004; B60C 23/121; B60C 23/126
See application file for complete search history.

(56) References Cited

U.S. PATENT DOCUMENTS

| | | | |
|---|---|---|---|
| 1,050,886 | A | 1/1913 | Wetherell |
| 1,134,361 | A | 4/1915 | Wetherell |
| 1,682,992 | A | 9/1928 | McKone |
| 2,095,489 | A | 9/1935 | Cotton |
| 3,304,981 | A | 2/1967 | Sheppard |
| 3,833,041 | A | 9/1974 | Glad et al. |
| 4,651,792 | A | 3/1987 | Taylor |
| 4,922,984 | A | 5/1990 | Dosjoub et al. |
| 5,052,456 | A | 10/1991 | Dosjoub |
| 5,694,969 | A | 12/1997 | DeVuyst |
| 5,947,696 | A | 9/1999 | Baumgarten |

(Continued)

FOREIGN PATENT DOCUMENTS

| | | |
|---|---|---|
| DE | 3433318 | 3/1986 |
| DE | 3433318 A1 | 3/1986 |

(Continued)

OTHER PUBLICATIONS

European Search Report dated Apr. 16, 2018 for Application Serial No. EP17208575.

*Primary Examiner* — Scott A Browne
(74) *Attorney, Agent, or Firm* — June E. Rickey

(57) ABSTRACT

An inlet control valve suitable for use with a tire and pump assembly is described that controls the flow of air from the pump into the tire. The inlet control valve includes an optional bi-directional feature. The pathways alternatively operate to deliver ambient non-pressurized air to the air pumping tube in response to directional tire rotation against a ground surface.

18 Claims, 8 Drawing Sheets

(56) References Cited

U.S. PATENT DOCUMENTS

| | | | |
|---|---|---|---|
| 5,975,174 A | 11/1999 | Loewe | |
| 6,240,951 B1 | 6/2001 | Yori | |
| 6,269,691 B1 | 8/2001 | Sowatzke et al. | |
| 6,601,625 B2 | 8/2003 | Rheinhardt | |
| 6,659,404 B1 | 12/2003 | Roemke | |
| 6,691,754 B1 | 2/2004 | Moore | |
| 6,744,356 B2 | 6/2004 | Hamilton et al. | |
| 6,772,812 B1 | 8/2004 | Hamilton | |
| 6,955,531 B2 | 10/2005 | Wu | |
| 7,117,731 B2 | 10/2006 | Hrabal | |
| 7,207,365 B2 | 4/2007 | Nelson et al. | |
| 7,225,845 B2 | 6/2007 | Ellmann | |
| 7,314,072 B2 | 1/2008 | Bunker | |
| 7,322,392 B2 | 1/2008 | Hawes | |
| 7,408,453 B2 | 8/2008 | Breed | |
| 7,530,379 B1 | 5/2009 | Becker et al. | |
| 7,637,279 B2 | 12/2009 | Amley et al. | |
| 7,726,330 B2 | 6/2010 | Schuster | |
| 7,760,079 B2 | 7/2010 | Isono | |
| 7,909,076 B2 | 3/2011 | Wilson | |
| 7,911,332 B2 | 3/2011 | Caretta et al. | |
| 7,926,530 B2 | 4/2011 | Isono | |
| 8,042,586 B2 | 10/2011 | Losey et al. | |
| 8,052,400 B2 | 11/2011 | Isono | |
| 8,113,254 B2 | 2/2012 | Benedict | |
| 8,132,607 B2 | 3/2012 | Kusunoki et al. | |
| 8,136,561 B2 | 3/2012 | Sandoni et al. | |
| 8,235,081 B2 | 8/2012 | Delgado et al. | |
| 8,245,746 B2 | 8/2012 | Stanczak | |
| 8,267,666 B2 | 9/2012 | Gruber et al. | |
| 8,291,950 B2 | 10/2012 | Hinque et al. | |
| 8,322,036 B2 | 12/2012 | Delgado et al. | |
| 8,356,620 B2 | 1/2013 | Colussi et al. | |
| 8,381,784 B2 | 2/2013 | Delgado | |
| 8,381,785 B2 | 2/2013 | Losey | |
| 8,435,012 B2 | 5/2013 | Clinciu | |
| 8,464,580 B2 | 6/2013 | Paul | |
| 8,528,611 B2 | 9/2013 | Wilson et al. | |
| 8,534,335 B2 | 9/2013 | Benedict | |
| 8,550,137 B2 | 10/2013 | Delgado et al. | |
| 8,573,270 B2 | 11/2013 | Hinque | |
| 8,656,972 B2 | 2/2014 | Hinque et al. | |
| 8,662,127 B2 | 3/2014 | Hinque et al. | |
| 8,695,661 B2 | 4/2014 | Delgado et al. | |
| 8,701,726 B2 | 4/2014 | Hinque | |
| 8,746,306 B2 | 6/2014 | Hinque et al. | |
| 8,763,661 B2 | 7/2014 | Richardson | |
| 8,807,182 B2 | 8/2014 | Kelly | |
| 8,820,369 B2 | 9/2014 | Hinque et al. | |
| 8,820,376 B2 | 9/2014 | Bormann | |
| 8,851,132 B2 | 10/2014 | Delgado et al. | |
| 8,857,484 B2 | 10/2014 | Hinque | |
| 8,919,402 B2 | 12/2014 | Hansen | |
| 8,944,126 B2 | 2/2015 | Frantzen | |
| 8,955,567 B2 | 2/2015 | Hinque et al. | |
| 8,960,249 B2 | 2/2015 | Lin | |
| 8,973,633 B2 | 3/2015 | Wilson et al. | |
| 8,985,171 B2 | 3/2015 | Hinque et al. | |
| 8,991,456 B2 | 3/2015 | Gobinath | |
| 9,039,092 B1 | 5/2015 | Krankkala et al. | |
| 9,039,386 B2 | 5/2015 | Richardson et al. | |
| 9,045,005 B2 | 6/2015 | Gobinath et al. | |
| 9,061,556 B2 | 6/2015 | Hinque | |
| 9,104,209 B2 | 8/2015 | Colussi et al. | |
| 9,114,674 B2 | 8/2015 | Hall | |
| 9,126,462 B2 | 9/2015 | Hinque | |
| 9,205,714 B2 | 12/2015 | Hinque | |
| 9,216,619 B2 | 12/2015 | Lin | |
| 9,216,620 B2 | 12/2015 | Lamgaday et al. | |
| 9,233,582 B2 | 1/2016 | Hinque et al. | |
| 9,238,388 B2 | 1/2016 | Fletcher et al. | |
| 9,242,518 B2 | 1/2016 | Hinque | |
| 9,259,981 B2 | 2/2016 | Durr | |
| 9,272,586 B2 | 3/2016 | Durr | |
| 9,278,584 B2 | 3/2016 | Bushnell et al. | |
| 9,302,556 B2 | 4/2016 | Cuny et al. | |
| 9,308,784 B2 | 4/2016 | Hinque | |
| 9,308,787 B2 | 4/2016 | Hinque | |
| 9,308,788 B2 | 4/2016 | Fazekas | |
| 9,327,560 B2 | 5/2016 | Hinque | |
| 9,327,561 B2 | 5/2016 | Hinque | |
| 9,333,816 B2 | 5/2016 | Durr | |
| 9,340,077 B2 | 5/2016 | Hinque et al. | |
| 9,365,084 B2 | 6/2016 | Hinque | |
| 9,381,780 B2 | 7/2016 | Hinque | |
| 9,409,450 B2 | 8/2016 | Dean et al. | |
| 9,415,640 B2 | 8/2016 | Lin | |
| 9,429,243 B2 | 8/2016 | Hessling et al. | |
| 9,533,534 B2 | 1/2017 | Lamgaday | |
| 9,539,869 B2 | 1/2017 | Hinque et al. | |
| 9,555,672 B2 | 1/2017 | Bernhardt et al. | |
| 9,783,015 B2 | 10/2017 | Lin | |
| 9,796,224 B2 | 10/2017 | Lamgaday et al. | |
| 2002/0124925 A1 | 9/2002 | Caretta et al. | |
| 2004/0112495 A1 | 6/2004 | Weise | |
| 2004/0173296 A1 | 9/2004 | White et al. | |
| 2004/0202546 A1 | 10/2004 | Kayukawa et al. | |
| 2005/0279439 A1* | 12/2005 | Wessman, Sr. | B60C 23/12 152/419 |
| 2006/0201598 A1 | 9/2006 | Rheinhardt et al. | |
| 2007/0240803 A1 | 10/2007 | Marin-Martinod | |
| 2008/0308206 A1 | 12/2008 | Okada | |
| 2009/0107602 A1 | 4/2009 | Kabakov | |
| 2009/0294006 A1 | 12/2009 | Hrabal | |
| 2010/0243121 A1 | 9/2010 | Eigenbrode | |
| 2010/0300591 A1 | 12/2010 | Rheinhardt | |
| 2012/0234447 A1 | 9/2012 | Narloch et al. | |
| 2012/0305126 A1 | 12/2012 | Merrill | |
| 2013/0306192 A1 | 11/2013 | Hennig | |
| 2014/0000778 A1 | 1/2014 | Gobinath | |
| 2014/0020805 A1 | 1/2014 | Gobinath et al. | |
| 2014/0110030 A1 | 4/2014 | Krempel | |
| 2014/0130895 A1 | 5/2014 | Hinque et al. | |
| 2014/0150945 A1 | 6/2014 | Kumar et al. | |
| 2014/0158267 A1 | 6/2014 | Gobinath | |
| 2014/0166118 A1 | 6/2014 | Stephens | |
| 2014/0261942 A1 | 9/2014 | Fletcher et al. | |
| 2014/0271261 A1 | 9/2014 | Boelryk | |
| 2015/0090386 A1 | 4/2015 | Lin et al. | |
| 2015/0096657 A1 | 4/2015 | Bennett et al. | |
| 2015/0122389 A1 | 5/2015 | Durr | |
| 2015/0147198 A1 | 5/2015 | Chawla et al. | |
| 2015/0147199 A1 | 5/2015 | Chawla et al. | |
| 2015/0147201 A1 | 5/2015 | Griffoin | |
| 2015/0165840 A1 | 6/2015 | Hinque | |
| 2015/0165841 A1 | 6/2015 | Hinque | |
| 2015/0174973 A1 | 6/2015 | Hinque et al. | |
| 2015/0231937 A1 | 8/2015 | Holdrich et al. | |
| 2015/0268669 A1 | 9/2015 | Vogt et al. | |
| 2015/0314657 A1 | 11/2015 | Lin | |
| 2015/0375575 A1 | 12/2015 | Benedict et al. | |
| 2015/0375577 A1 | 12/2015 | Serbu et al. | |
| 2016/0046157 A1 | 2/2016 | Lin | |
| 2016/0046159 A1 | 2/2016 | Lin | |
| 2016/0082788 A1 | 3/2016 | Matlow | |
| 2016/0176243 A1 | 6/2016 | Lin | |
| 2016/0243776 A1 | 8/2016 | Michel | |
| 2016/0327178 A1 | 11/2016 | Hessling et al. | |
| 2016/0332486 A1 | 11/2016 | Strashny et al. | |
| 2017/0015148 A1 | 1/2017 | Serret Avila et al. | |
| 2017/0015157 A1 | 1/2017 | McClellan | |
| 2017/0015159 A1 | 1/2017 | Richardson | |
| 2017/0144492 A1 | 5/2017 | Lamgaday | |

FOREIGN PATENT DOCUMENTS

| | | |
|---|---|---|
| DE | 4323835 A1 | 1/1995 |
| FR | 2568345 | 1/1986 |
| RU | 2106978 | 3/1998 |
| SE | 183890 | 5/1963 |
| WO | 2003049958 | 6/2003 |
| WO | 2005012009 A1 | 7/2004 |
| WO | 2007134556 | 11/2007 |
| WO | 2010008338 | 1/2010 |

(56) References Cited

FOREIGN PATENT DOCUMENTS

| WO | WO2014117157 A1 | 7/2014 |
| WO | WO2014149754 A1 | 9/2014 |
| WO | 2015014904 | 2/2015 |
| WO | 2015104528 | 7/2015 |
| WO | 2015105848 A2 | 7/2015 |
| WO | 2015112109 | 7/2015 |
| WO | WO2014182979 A4 | 7/2015 |
| WO | 2015114153 A1 | 8/2015 |
| WO | 2016009342 | 1/2016 |
| WO | 2015193838 A1 | 3/2016 |
| WO | 2016189273 A | 12/2016 |
| WO | 2017011692 A | 1/2017 |

* cited by examiner

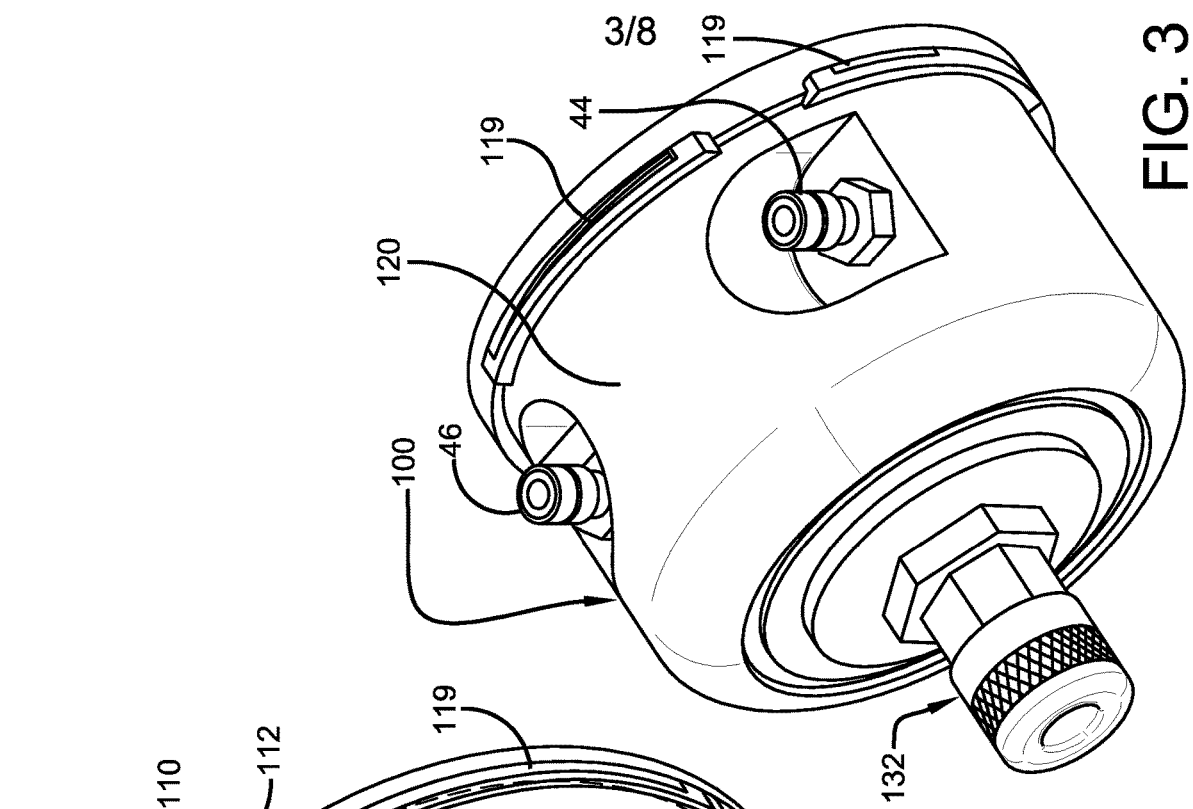
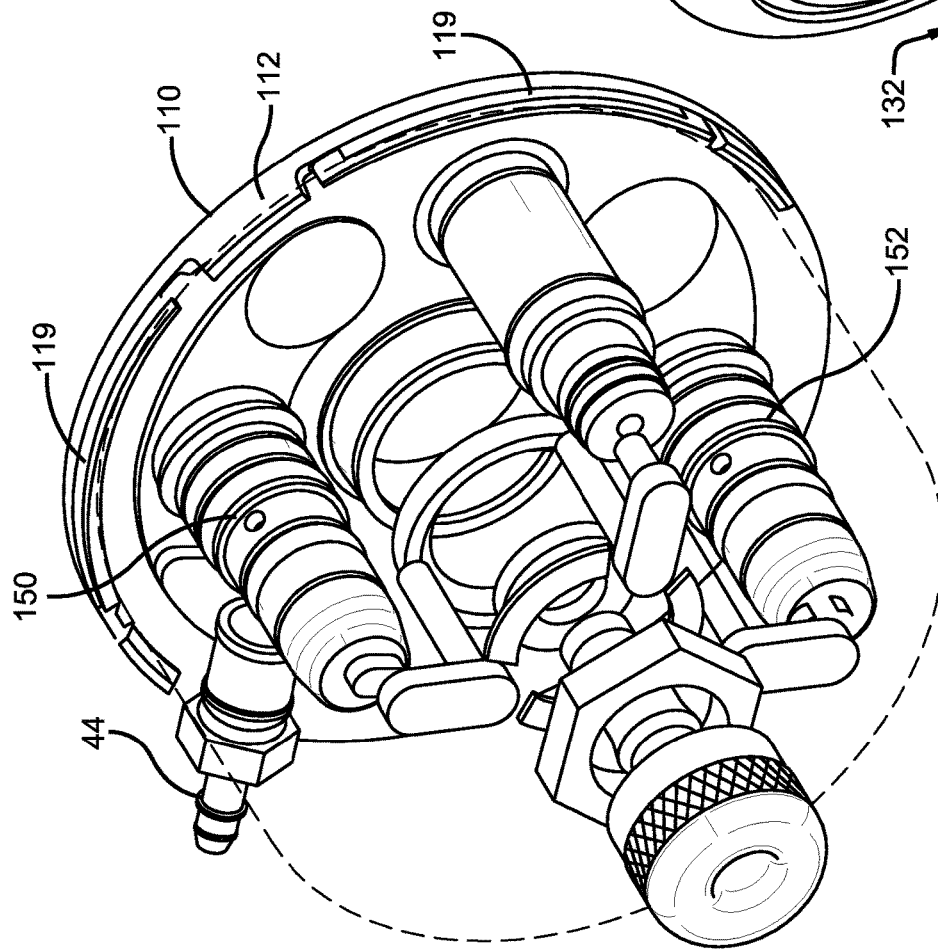

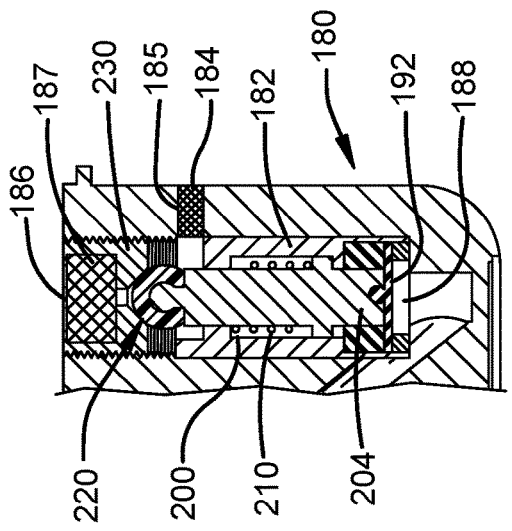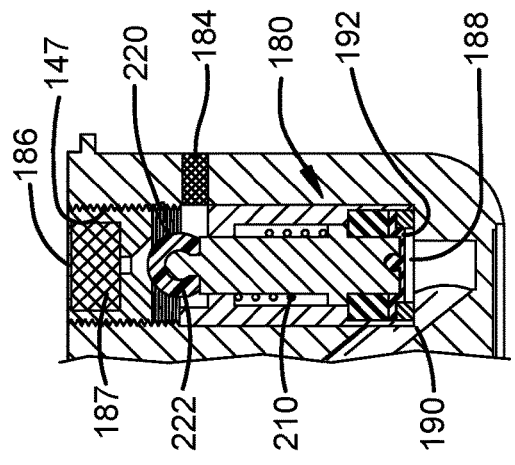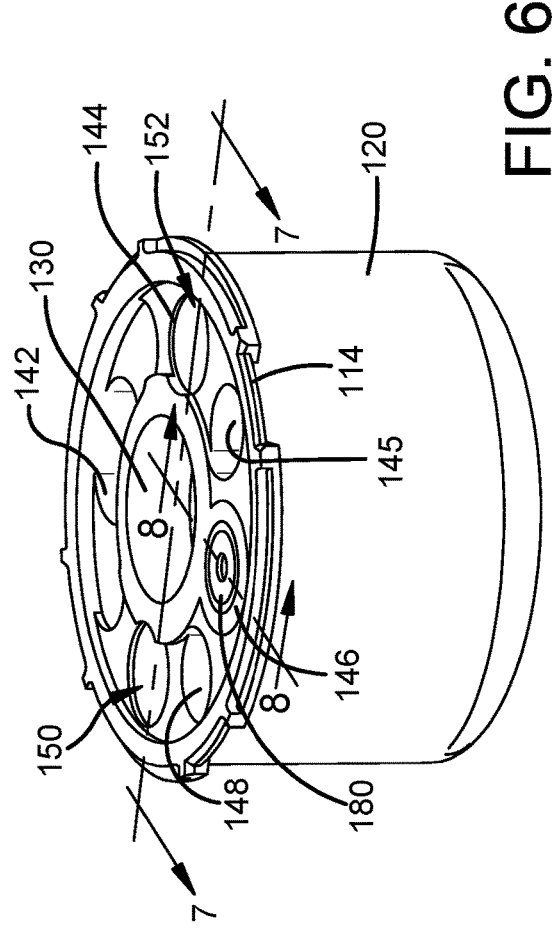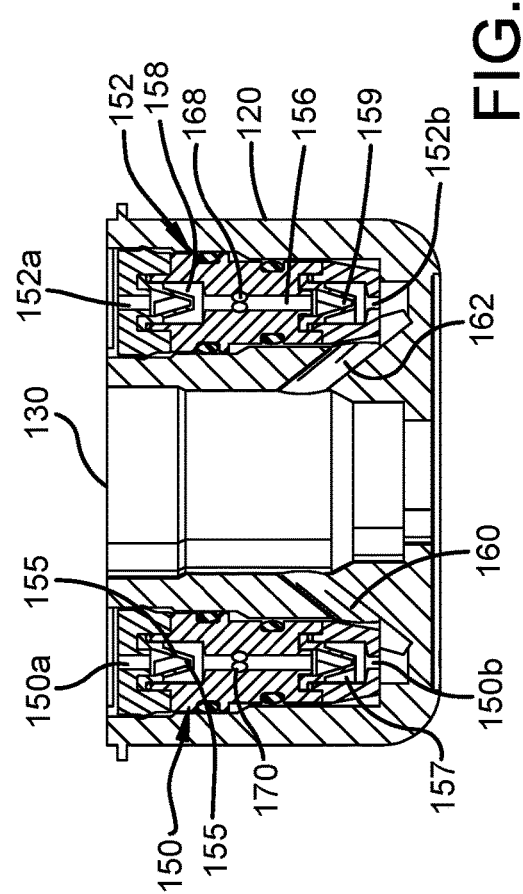

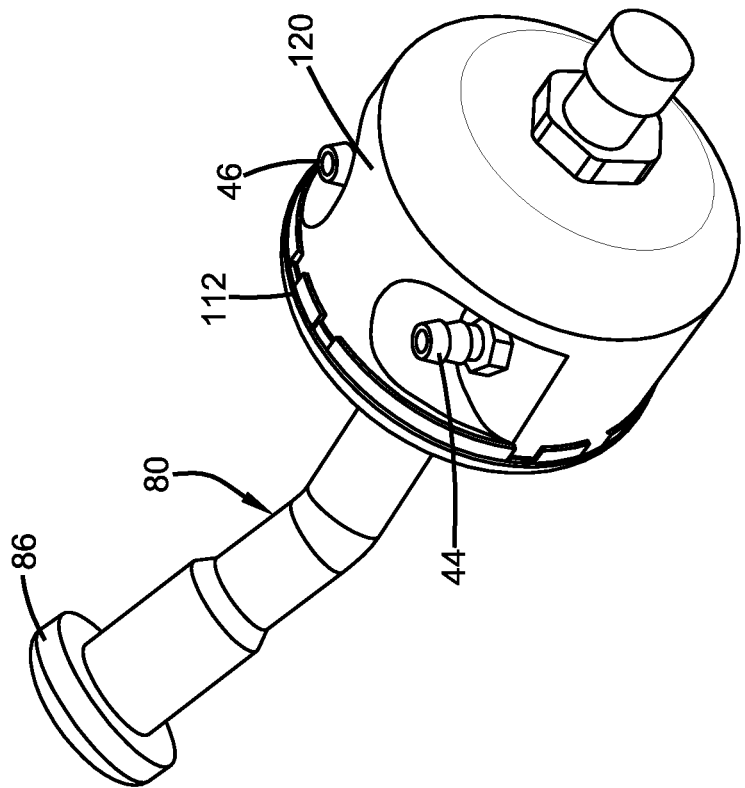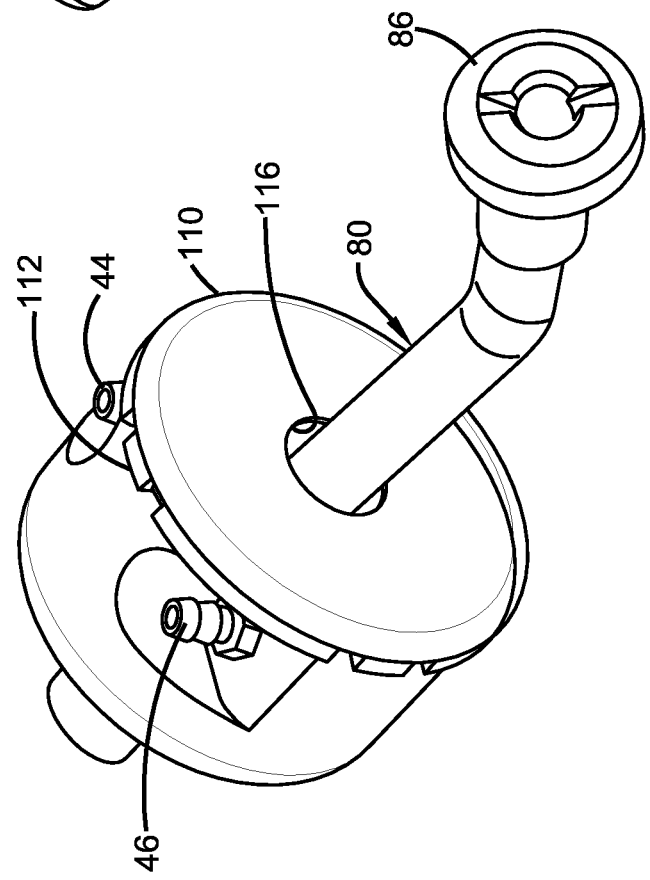

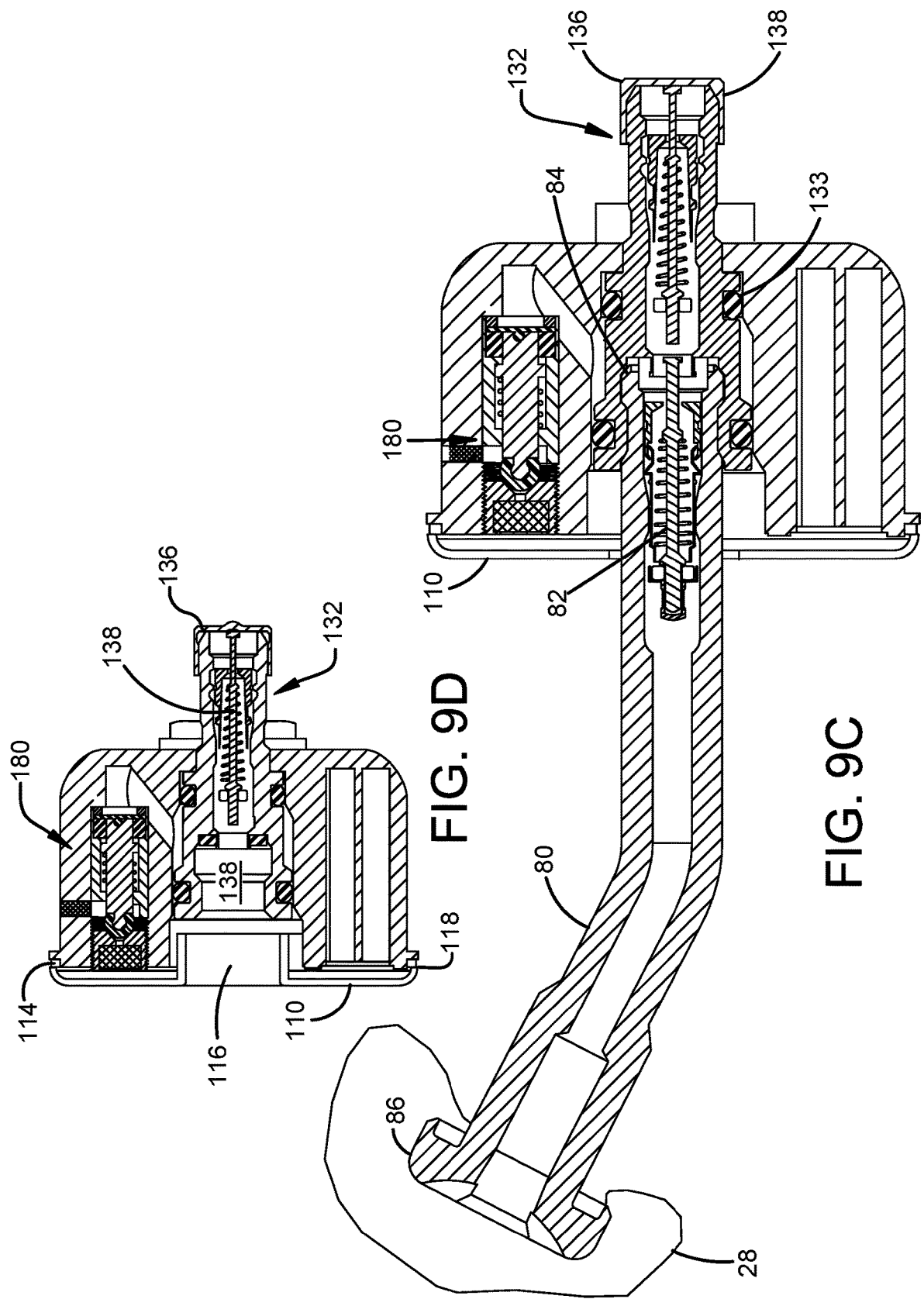

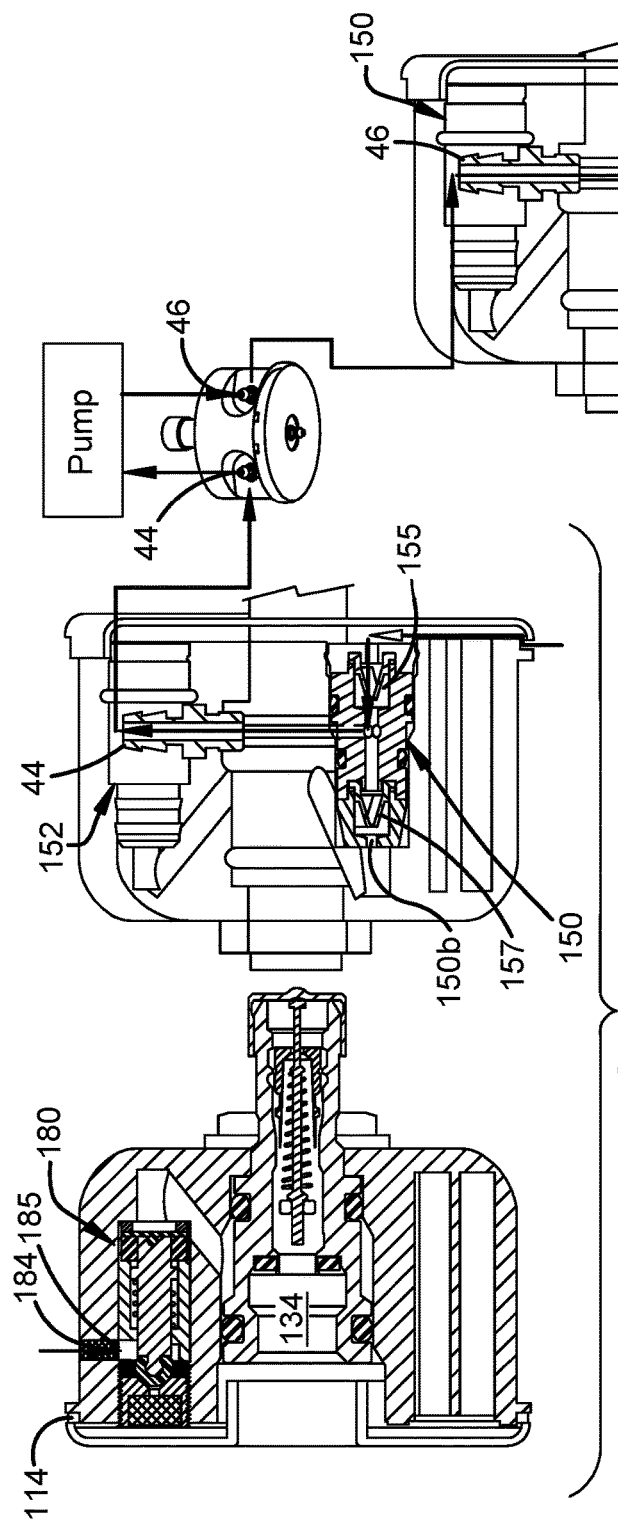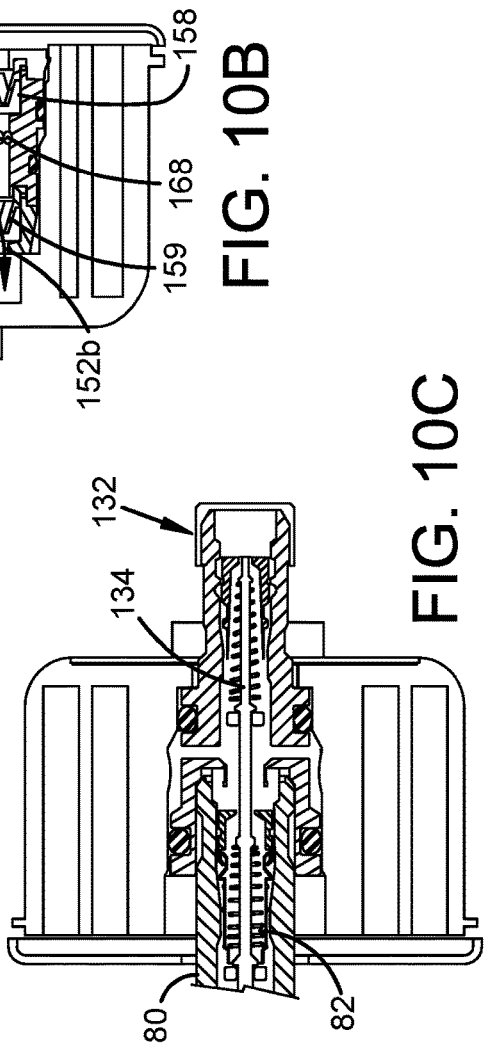

INLET CONTROL VALVE FOR AN AIR MAINTENANCE TIRE

FIELD OF THE INVENTION

The invention relates generally to valves for tires, and more particularly to a control valve for an air maintenance tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, an inlet control valve assembly mounts to a tire valve stem and operably controls a flow of pressurized air through the tire valve stem from either an external pressurized air source or a wheel or tire mounted pressurized air source. The tire mounted pressurized air source may be a peristaltic pump preferably built into the tire sidewall. The wheel mounted pressurized air source may comprise a wheel mounted pump. The control valve assembly optionally includes a bi-directional feature so that if a peristaltic pump is used, the tire may rotate in either direction and pump air into the valve stem.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Duck Valve" is a check valve manufactured from rubber or synthetic elastomer, and shaped like the beak of a duck. One end of the valve is stretched over the outlet of a supply line, conforming itself to the shape of the line. The other end, the duckbill, retains its natural flattened shape. When pressurized air is pumped from the supply line through the duckbill, the flattened end opens to permit the pressurized air to pass. When pressure is removed, the duckbill end returns to its flattened shape, preventing backflow.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Inward" directionally means toward the tire cavity.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Outward" directionally means in a direction away from the tire cavity.

"Peristaltic" means operating by means of wave-like contractions that propel contained matter, such as air, along tubular pathways.

"Radial" and "radially" means directions radially toward or away from the axis of rotation of the tire.

BRIEF DESCRIPTION OF THE DRAWINGS

The invention will be described by way of example and with reference to the accompanying drawings in which:

FIG. 3 is a perspective rear view of the control valve of the present invention.

FIG. 4 is a perspective rear view of the control valve of the present invention shown with the component parts.

FIG. 6 is a front perspective view of the housing of the control valve with the check valve modules mounted therein.

FIG. 7 is a side cross-sectional view of FIG. 6 in the direction 7-7.

FIG. 8A is a cross-sectional view of the inlet control valve in the direction 8-8, wherein the inlet control valve is in the closed position, and FIG. 8B illustrates the open position.

FIG. 9A is a perspective front view of the control valve mounted on a tire valve (tire omitted for clarity);

FIG. 9B is a perspective rear view of the control valve mounted on a tire valve (tire omitted for clarity)

FIG. 9C is a cross-sectional side view of the control valve mounted to a tire valve (tire omitted for clarity)

FIG. 9D is a cross-sectional view of the control valve showing the manual fill assembly and main pressure chamber;

FIG. 10A is a side cross-sectional view of the control valve showing the air pathway from the inlet to the pump inlet.

FIGS. 10B and 10C are side cross-sectional views of the control valve showing the air pathway from the pump outlet through the control valve and into the tire.

DETAILED DESCRIPTION OF THE INVENTION

Figure 1A:
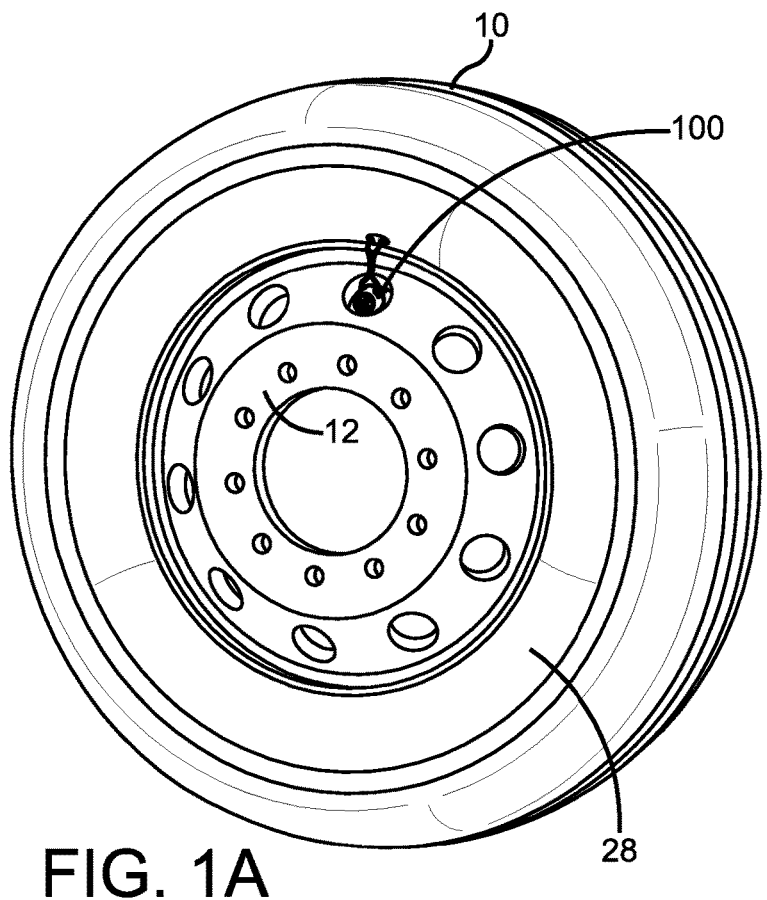
FIG. 1A is a perspective view of a tire with a control valve of the present invention mounted on a tire valve stem.
Figure 1B:
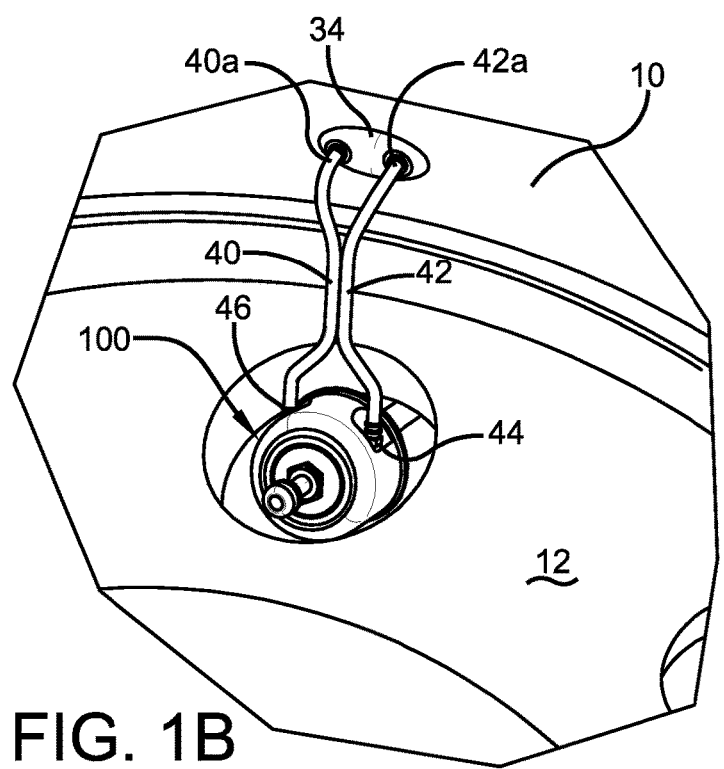
FIG. 1B is a close up view of the control valve of FIG. 1A.
Figure 2:
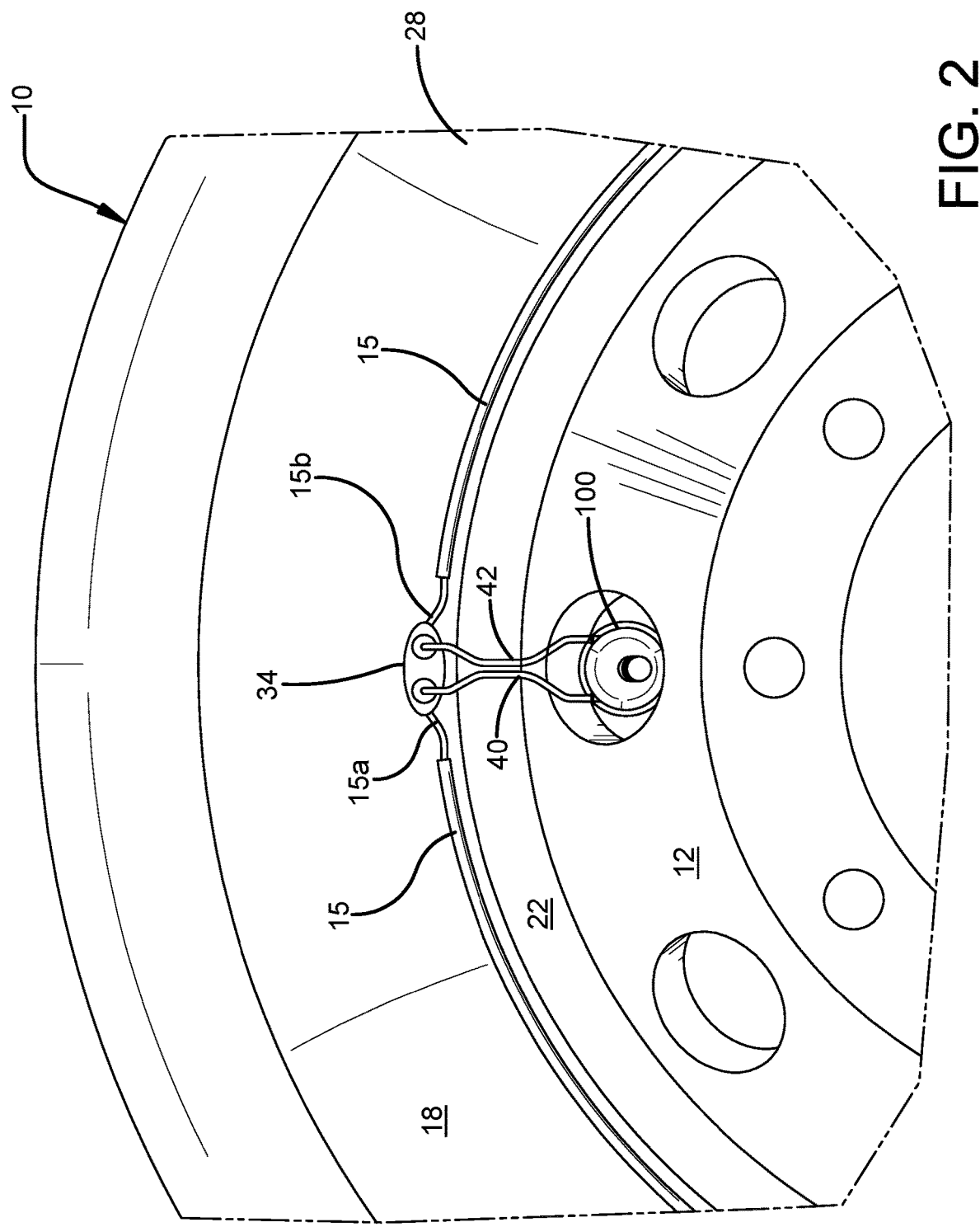
FIG. 2 is a partial view of the tire shown with the control valve connected to a pump mounted in the tire (and shown in phantom).
Figure 5:
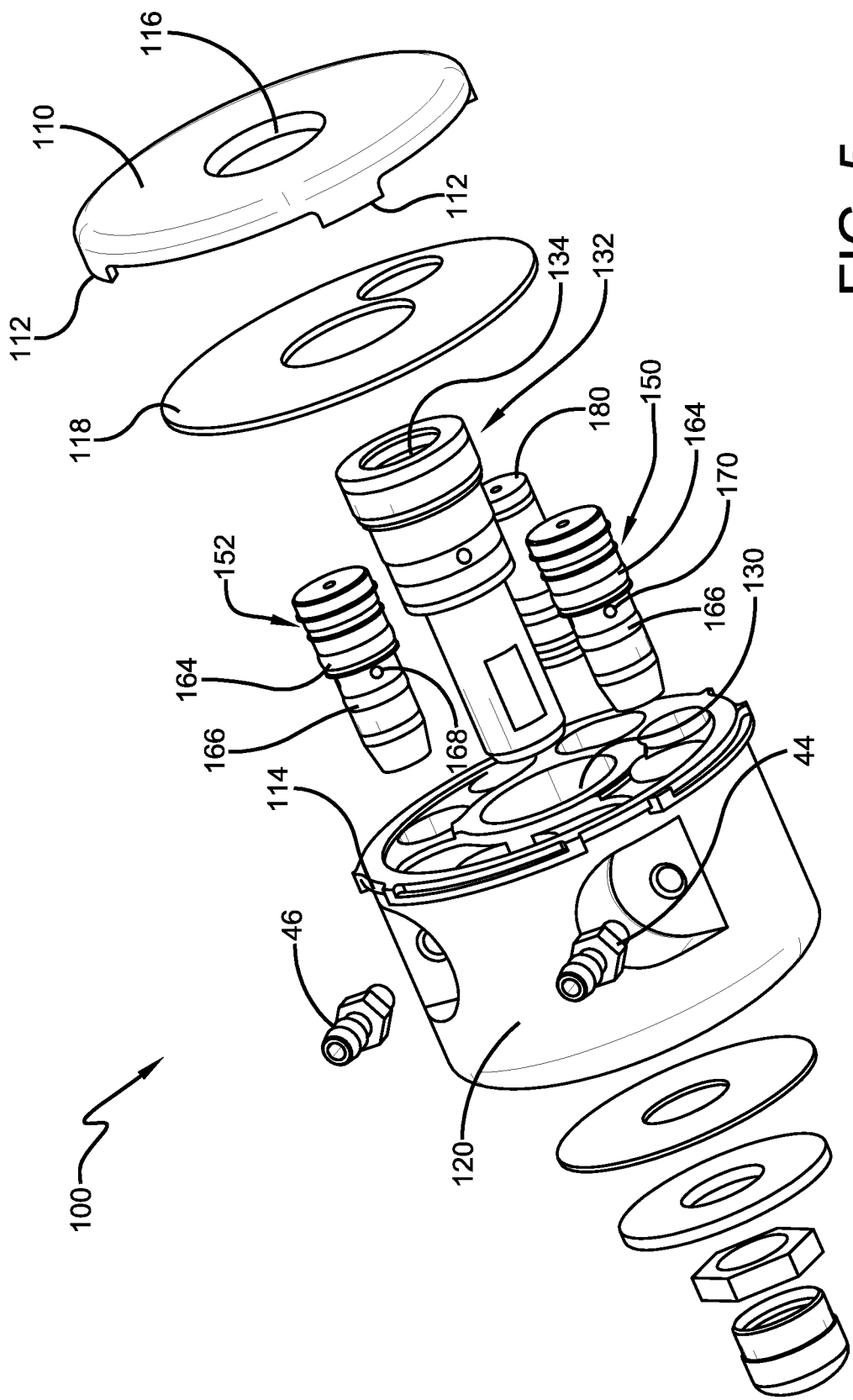
FIG. 5 is an exploded view of the control valve of the present invention.

Referring to FIG. 1, a control valve assembly 100 of the present invention is shown mounted to a valve stem 80 of a tire 10. The tire 10 is mounted on a tire rim body 12. As shown in FIG. 2, the tire may include an internal peristaltic pump 15 which may be mounted in the tire sidewall. The peristaltic pump 15 may preferably be annular or 360 degree pump so that the inlet end of the pump is several inches from the outlet end of the pump assembly. The tire and rim body enclose a tire cavity 28. The tire includes a conventional valve stem 80 for pumping air into the tire cavity 28. As shown in FIG. 9C, the conventional valve stem 80 has a distal end 84 having an internal valve core 82 such as a presta valve core or a shrader valve core that functions as a check valve to prevent the loss of air from the tire cavity 28. The tire valve stem 80 has a second end 86 that is positioned in the tire cavity so that fluid may be communicated from the distal end 84 of the valve stem through the tire valve core 84 and into the cavity.

The peristaltic pump 15 may comprise a molded annular passageway or an annular air tube that is inserted into an annular passageway preferably located in the sidewall. The tube is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity 28 to maintain the tire 10 at a preferred inflation pressure.

The peristaltic principles of incorporating a deformable air tube within a tire are shown and described in U.S. Pat. No. 8,113,254, incorporated herein by reference in its entirety. In the patented system, the tube is incorporated within an annular tire passageway formed within the tire proximate a tire bead region. As the tire rotates air from outside the tire is admitted into the tube and pumped along the air tube by the progressive squeezing of the tube within the tire as the tire rotates. Air is thus forced into an outlet valve and therefrom into the tire cavity to maintain air pressure within the tire cavity at a desired pressure level.

As partially shown in FIG. 2, the pump 15 is preferably annular and is preferably located in the tire sidewall 18 region proximate to a bead region 22. However, other configurations for the air tube may be devised without departing from the invention. Opposite ends 15a,15b of the pump connect into an inline connector block 34. Conduits 40, 42 each have a first end 40a,42a coupled to the connector block 34, wherein each first end is connected to a respective end of the pumping tube 15a,15b. A second end 40b,42b of each conduit 40,42 is connected to the control valve ports 44,46. Conduits 40 and 42 represent air channels to and from the pump 15. In the pumping mode, forward revolution of the tire, one conduit delivers air to the pumping tube and the other conduit conducts air pressurized by the pumping tube to the control valve 100. In the reverse rotational direction of the tire, the conduits 40,42 functionally reverse.

A first embodiment of the control valve 100 is shown in FIGS. 3-10. As shown in FIG. 3, the control valve 100 has a removable cap 110 that has detents 112 on the outer rim surface that snap onto aligned edges 114 of a valve body 120. The cap has a central hole 116 for receiving a distal end 84 of the tire valve stem 80. Positioned underneath the cap 110 is a sealing gasket 118 so that the when the cap 110 is mounted on the valve body 120, the control valve 100 is air tight.

The valve body 120 is preferably round and compact, and has a central bore 130 for receiving a main pressure module 132. As shown in FIG. 9D, the main pressure module 132 has a first end 133 housing an internal main pressure chamber 134, and a second end 136 having an optional valve core 138 positioned therein, preferably a schrader valve core. The second end 136 is useful for connection to an external pressure source so that the system may be manually filled by a user. FIG. 9c illustrates the distal end 84 of the valve stem 80 positioned in the main pressure chamber 134. The main pressure module 132 has sealing gaskets 135,137 to maintain a fluid tight seal. Auxiliary pressurized air from an external pump source may be connected to the distal end 136 to manually inflate the tire cavity 28 through the valve stem 80 to the desired pressure.

As shown in FIG. 6, the valve body 120 has a plurality of chambers 142,144,145, 146, 147, 148 that are preferably concentrically located about the main pressure module 132. Chambers 142,145 and 148 remain empty and are optional fluid reservoirs. Chambers 144,146 preferably each have a check valve module 150,152 inserted therein. Each check valve module 150,152 has a central passageway 154,156 in fluid communication with an inlet end 150a,152a and an outlet end 150b,152b. Preferably, each passageway 154,156 are parallel to each other and are straight with no bends. Positioned within each central passageway 154,156 is at least one check valve 155,159. For bidirectional feature such that the tire can be pumped in either rotational direction, there are preferably two check valves 155,157, and 158,159 mounted in series in a respective module. The four check valves are all oriented in the same direction, so that the flow travels from the inlet to the outlet without reversing. The check valves 155,157,158,159 are preferably duck bill type check valves and are oriented to allow flow from the inlet end to the outlet end, and to prevent backflow in the direction from the outlet to the inlet.

As shown in FIG. 7, each check valve module 150,152 has first and second seals 164,166. One of the check valve modules functions as a pump inlet chamber, while the other chamber functions as a pump outlet chamber. If the valve is connected to a peristaltic pump, the direction of the tire rotation determines which check valve module functions as a pump inlet chamber and pump outlet chamber. Located between the first and second seals 164,166 is an outlet port 168,170 that is in fluid communication with a respective passageway 154,156. Each outlet port 168,170 is preferably located between the first and second set of check valves as shown in FIG. 7. Outlet port 168 is in fluid communication with port 46, while outlet port 170 is in fluid communication with port 44.

Each outlet end 150b,152b of each check valve module 150,152 is connected in fluid communication with passageways 160,162 respectively. The passageways 160,162 are in fluid communication with the main pressure chamber 134. The main pressure chamber 134 is also in fluid communication with the inlet end of the tire valve stem 80.

The inlet control valve 180 is positioned in chamber 147 of control valve 100. The inlet control valve uses cold set inflation control of inlet air into the pump inlet. The inlet control valve is positioned in the closed position as shown in FIG. 8A when the tire cavity pressure is greater than the set pressure. When the inlet control valve is closed, no air may enter the pump. When the cavity pressure is less than the set pressure, the inlet control valve opens and allows air into the pump as shown in FIG. 8B. The inlet control valve 180 is contained in a cylindrical housing 182 mounted in chamber 147. The cylindrical housing 182 has an inlet 184 and an outlet 186. The outlet 186 is in fluid communication with channel 190 located between the cap 110 and the valve body 120. The channel 190 directs the air flow from the inlet control valve to the pump inlet via the check valve control modules 150,152. An inlet filter 185 may be located in the inlet passage 184 or an outlet filter 187 may optionally be located at the valve outlet passage 186. The valve housing further includes a second outlet passageway 188 that is in fluid communication with the main pressure chamber 134 via passage 190. The second outlet passageway 188 is in fluid communication with a diaphragm 192. A valve actuator 200 is received within an inner cylindrical passageway 202 of inlet control valve 180. The valve actuator 200 has a first end 204 positioned for engagement with the flexible diaphragm 192 to open and close the second outlet passageway 188 in response to the main pressure chamber 134. A spring 210 biases the valve actuator in the closed position so that the first end 220 of the valve actuator seals the valve outlet passage 186 so that no fluid may enter the pump. Preferably, the first end 220 has an elastomeric seal 222 located thereon. The valve housing preferably has an adjustable set screw 230 located at the distal end of the chamber. The adjustable set screw 230 adjusts the compression force of the spring 210.

System Operation

The operation of the system is shown in FIGS. 10A-10C. As shown in FIGS. 10A &B, outside ambient air is sucked into the system through the inlet passageway 184 when the main pressure chamber pressure falls below the set pressure. The ambient air passes through the filter 185 and then through check valve 155 of the first check valve module 150. The air exits the check valve module 150 through port 170, through valve body port 44 and then into the inlet of the peristaltic pump 15a. As the tire rotates, the air is compressed in the peristaltic pump and exits the pump chamber to pump outlet 15b. The compressed air enters the control valve through port 46. As shown in FIG. 10b, the compressed air travels through the second check valve module 152 through port 168. The compressed air exits the second check valve module through check valve 159 and out through outlet 152b and into passageway 162 of the valve body and into the main pressure chamber 134 of the control valve 100. If the pressure of the main pressure chamber is greater than the cracking pressure of the tire valve 82, then the pressurized air will enter the tire cavity through the valve stem 80 of the tire. If the pressure of the main pressure chamber is less than the cracking pressure of the tire valve 82, then the tire valve 82 will remain closed. When the main pressure chamber exceeds the set pressure of the inlet control valve, the inlet control valve will close. The set pressure may be adjusted by adjusting the set screw 187.

The control valve can operate bi-directionally, so that if the tire rotates in the opposite direction, the system will pump without any changes being made to the system. The bi-directionality in pumping air from the pump is made possible by the dual air flow paths 154,156, wherein each flow path preferably is straight with no bends. The bi-directional feature is useful when the pump is located in the tire, so that if the tire rotates in either direction the system will inflate the tire cavity. However, the bi-directional feature is optional. The system may also work for a one directional system, a check valve from each check valve module i.e., check valves 157 and 158 can be eliminated.

The advantages of the subject invention is that the control valve retains the ability to manually fill air into the tire with the use of a standard external pump, while the control valve directs the pressurized air to pump the tire cavity during operation of the system. The control valve has a compact housing that can be installed onto a tire valve stem for pumping air from the pump into the tire cavity through the valve stem. The inlet control valve is responsive to the pressure of the main pressure chamber, and if the main pressure chamber pressure is less than the set pressure, the inlet control valve will open so that the pump can pump air into the tire cavity. If the main pressure chamber pressure is higher than the set pressure, the inlet control valve will close. The set pressure is easily adjusted by screw adjustment to the inlet control regulator without dismounting the tire. The filter and the control valve in its entirety may be easily replaced if needed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A control valve for controlling the pressure of a tire cavity during operation of a pump having a pump inlet and a pump outlet, said tire having a tire cavity and a valve stem having a distal end, the control valve comprising:
    a valve body having a pump inlet chamber, a pump outlet chamber, and a control chamber, wherein a first check valve is positioned in the pump inlet chamber so that the first check valve is located between an air inlet and a pump inlet port, said valve body further comprising a second check valve positioned in the pump outlet chamber, said second check valve being positioned between a pump outlet port and a main pressure chamber, said valve body further comprising an inlet control valve positioned in the control chamber, said inlet control valve having an inlet end in fluid communication with the outside air, an outlet end in fluid communication with the pump inlet chamber, and an actuating end in fluid communication a main pressure chamber; and
    wherein the main pressure chamber is in fluid communication with the pump outlet chamber, and the distal end of the tire valve stem.

2. The control valve of claim 1 wherein the pump inlet port and pump outlet port are connectable to the pump inlet, pump outlet, respectively.

3. The control valve of claim 1 wherein the valve body is shaped like a cup.

4. The control valve of claim 1 wherein a cap is received over a first end of the valve body.

5. The control valve of claim 1 wherein the valve body further comprises a cap having detents which latch with an outer rim of the valve body forming a snap fit.

6. The control valve of claim 1 wherein the valve body is injection molded.

7. The control valve of claim 1 wherein the pump inlet chamber has a third check valve positioned between the pump inlet port and the main pressure chamber.

8. The control valve of claim 7 wherein the pump outlet chamber has a fourth check valve positioned between the pump outlet port and an inlet hole.

9. The control valve of claim 1 wherein the main pressure chamber is in fluid communication with a manual fill assembly disposed at an outer end of the valve body.

10. The control valve of claim 1 having an internal passageway in fluid communication with the main pressure chamber, wherein the internal passageway is configured for mounted on the distal end of the tire valve stem.

11. A control valve for controlling the pressure of a tire cavity during operation of a pump having a pump inlet and a pump outlet, said tire having a tire cavity and a valve stem having a distal end, the control valve comprising:
a valve body having a pump inlet chamber, a pump outlet chamber, and a control chamber, wherein a first check valve module is positioned in the pump inlet chamber, said first check valve module having a first flow path and a first check valve mounted therein;
said valve body further comprising a second check valve module positioned in the pump outlet chamber, said second check valve module having a second flow path and a second check valve mounted therein;
said valve body further comprising an inlet control valve positioned in the control chamber, said inlet control valve having an outlet end in fluid communication with the main pressure chamber and the pump inlet, and an inlet end in fluid communication with the atmosphere; and
wherein the main pressure chamber is in fluid communication with the pump outlet chamber, and the distal end of the tire valve stem.

12. A control valve for controlling the pressure of a tire cavity during operation of a pump, said tire having a tire cavity and a valve stem having a distal end, the control valve comprising:
a valve body having a pump inlet port, a pump outlet port, and a main pressure chamber;
wherein a first check valve is positioned between an air inlet hole and the pump inlet port;
wherein a second check valve is positioned between a pump outlet port and a main pressure chamber, said valve body further comprising an inlet control valve having a first outlet end, wherein a diaphragm is positioned in the first outlet end and being in fluid communication with a main pressure chamber; said valve body further comprising a second outlet in fluid communication with the pump inlet, and an inlet end in fluid communication with the atmosphere; and
wherein the main pressure chamber is in fluid communication with the pump outlet port, and the tire valve stem.

13. The control valve of claim 12 wherein compressed air from the pump outlet is communicated to the main pressure chamber, and if the pressure of the compressed air exceeds the cracking pressure of the tire valve stem, the tire cavity is inflated until the pressure of the main pressure chamber exceeds the set pressure of the inlet control valve.

14. The control valve of claim 12 wherein the valve body has an inlet hole for mounting to the distal end of the tire valve stem so that fluid from the main pressure chamber is communicable to the tire valve stem.

15. An air maintenance tire assembly comprising:
a tire having a tire cavity, said tire having a valve stem projecting outward from the tire cavity, said valve stem having an internal valve stem air passageway in communication with the tire cavity operative to direct pressurized air from the valve stem air passageway into the cavity;
a pump tube having an inlet end and an outlet end and being configured for pumping pressurized air into the tire cavity;
the control valve comprising a valve body having a pump inlet port, a pump outlet port, and a main pressure chamber;
wherein a first check valve is positioned between an air inlet hole and the pump inlet port, and a second check valve is positioned between a pump outlet port and the main pressure chamber, said valve body further comprising an inlet control valve positioned in the control chamber, said inlet control valve having an inlet end in fluid communication with the outside air, an outlet end in fluid communication with the pump inlet chamber, and an actuating end in fluid communication with a main pressure chamber;
wherein the main pressure chamber is in fluid communication with the pump inlet port, the pump outlet port, and the tire valve stem; and
wherein compressed air from the pump outlet is communicated to the main pressure chamber of the valve device, and if the pressure of the compressed air exceeds the cracking pressure of the tire valve stem, the tire cavity is inflated until the pressure of the main pressure chamber exceeds the set pressure of the inlet control valve.

16. The air maintenance tire assembly of claim 14 wherein the pump inlet chamber has a third check valve positioned between the pump inlet port and the main pressure chamber.

17. The air maintenance tire assembly of claim 16 wherein the pump outlet chamber has a fourth check valve positioned between the pump outlet port and an inlet hole.

18. The air maintenance tire assembly of claim 14 wherein the assembly is bidirectional.

* * * * *